(12) United States Patent
Shor et al.

(10) Patent No.: US 6,577,514 B2
(45) Date of Patent: Jun. 10, 2003

(54) CHARGE PUMP WITH CONSTANT BOOSTED OUTPUT VOLTAGE

(75) Inventors: Joseph Shor, Tel Mond (IL); Yair Sofer, Tel Aviv (IL); Eduardo Maayan, Kfar Sabe (IL)

(73) Assignee: Saifun Semiconductors Ltd., Netanya (IL)

( * ) Notice: Subject to any disclaimer, the term of this patent is extended or adjusted under 35 U.S.C. 154(b) by 0 days.

(21) Appl. No.: 09/827,511

(22) Filed: Apr. 5, 2001

(65) Prior Publication Data
US 2002/0145892 A1 Oct. 10, 2002

(51) Int. Cl.[7] ................................. H02M 3/18
(52) U.S. Cl. ............................. 363/59; 327/536
(58) Field of Search ............. 363/59, 60; 327/534, 327/535, 536, 540; 307/110

(56) References Cited

U.S. PATENT DOCUMENTS

| | | |
|---|---|---|
| 4,173,766 A | 11/1979 | Hayes |
| 4,742,491 A | 5/1988 | Liang et al. |
| 5,021,999 A | 6/1991 | Kohda et al. |
| 5,168,334 A | 12/1992 | Mitchell et al. |
| 5,241,497 A | 8/1993 | Komarek |
| 5,276,646 A | 1/1994 | Kim et al. |
| 5,280,420 A | 1/1994 | Rapp |
| 5,338,954 A | 8/1994 | Shimoji |
| 5,349,221 A | 9/1994 | Shimoji |
| 5,412,601 A | 5/1995 | Sawada et al. |
| 5,418,743 A | 5/1995 | Tomioka et al. |
| 5,424,978 A | 6/1995 | Wada et al. |
| 5,450,341 A | 9/1995 | Sawada et al. |
| 5,450,354 A | 9/1995 | Sawada et al. |
| 5,467,308 A | 11/1995 | Chang et al. |
| 5,477,499 A | 12/1995 | Van Buskirk et al. |
| 5,553,030 A | 9/1996 | Tedrow et al. |
| 5,559,687 A | 9/1996 | Nicollini et al. |
| 5,717,581 A | 2/1998 | Canclini |
| 5,726,946 A | 3/1998 | Yamagata et al. |
| 5,768,192 A | 6/1998 | Eitan |
| 5,825,686 A | 10/1998 | Schmitt-Landsiedel et al. |
| 5,946,258 A | 8/1999 | Evertt et al. |
| 6,011,725 A | 1/2000 | Eitan |
| 6,064,251 A | 5/2000 | Park |
| 6,075,402 A | 6/2000 | Ghilardelli et al. |
| 6,094,095 A | 7/2000 | Murray et al. |
| 6,107,862 A * | 8/2000 | Mukainakano et al. ...... 327/536 |
| 6,130,572 A | 10/2000 | Ghilardelli et al. |
| 6,163,048 A | 12/2000 | Hirose et al. |
| 6,198,342 B1 | 3/2001 | Kawai |
| 6,201,282 B1 | 3/2001 | Eitan |
| 6,356,469 B1 * | 3/2002 | Roohparvar et al. ......... 363/60 |

FOREIGN PATENT DOCUMENTS

GB 2157489 10/1985

OTHER PUBLICATIONS

Bude et al., "EEPROM/Flash Sub 3.0 V Drain–Source Bias Hot carrier Writing", IEDM 95, pp. 989–992.
Bude et al., "Secondary Electron Flash—a High Performance, Low Power Flash Technology for 0.35 $\mu$m and Below", IEDM 97, pp. 279–282.
Bude et al., "Modeling Nonequilibrium Hot Carrier Device Effects", Conference of Insulator Specialists of Europe, Sweden, Jun. 1997.

* cited by examiner

*Primary Examiner*—Adolf Deneke Berhane
(74) *Attorney, Agent, or Firm*—Eitan, Pearl, Latzer & Cohen-Zedek

(57) ABSTRACT

A charge pump regulator for providing a constant boosted voltage at the output of a charge pump includes: 1) a charge pump; 2) a clamping regulator; and 3) a clamping transistor. Certain preferred embodiments further include an auxiliary charge pump that provides a voltage above $V_{DD}$ or below ground to the clamping regulator. The clamping transistor provides a voltage supply level (Vsupp) to the oscillating clock signal generator which uses Vsupp to drive the oscillating clock signals that charge the energy injection capacitors of the charge pump between Vsupp and a reference voltage (Vref). The invention includes regulators for use with positive and negative charge pumps.

25 Claims, 10 Drawing Sheets

CHARGE PUMP WITH CONSTANT BOOSTED OUTPUT VOLTAGE

FIELD OF INVENTION

The present invention relates to charge pumps and, more particularly, to a charge pump feedback system for regulating the output voltage of a charge pump.

BACKGROUND

Charge pumps are devices that are capable of operating as power supplies for electronic circuitry. Charge pumps provide a controlled output voltage that is higher than the charge pump's input voltage.

Charge pumps are often designed in stagesin order to achieve optimum efficiency of operation. Four-phased multi-stage charge pumps are generally considered to be one of the most efficient pump architectures known in the art and are, accordingly, widely utilized in the art. A co-pending patent application titled Efficient Charge Pump Apparatus and Method For Operating the Same, U.S. Ser. No. 09/827,512 filed Apr. 5, 2001, assigned to the present assignee, which is hereby incorporated in its entirety, describes several embodiments of a novel multi-staged charge pump including a 4-phase clock charge pump that is capable of providing increased voltage at its output as compared to the voltage supplied at its input. As described herein, the charge pump is designed to receive a plurality of oscillating clock signals to power and control the operation of the charge pump.

While the charge pump described in the above-referenced application achieves a certain efficiency of operation over known prior art devices, one skilled in the art will appreciate that the output of the charge pump is dependent upon many unstable variables such as $V_{DD}$ (the positive voltage supply), temperature, process conditions and load, and as such, requires an appropriate regulation apparatus to control and provide for a constant voltage at the output of the charge pump.

Known prior art methods of regulating the output voltage of charge pumps have varied limitations that significantly effect the overall efficiency of the charge pump's operation.

The prior art method for providing regulation of a charge pump's output illustrated in FIG. 1 suffers from the drawback of current inefficiency. As shown in FIG. 1, the regulated output voltage of charge pump 100 is fed into a voltage divider 102 and compared to a reference voltage ($V_{ref}$) 104 at operational amplifier 106. In this prior art embodiment, the regulation of the output of charge pump 100 is achieved by shunting the output to ground 108. Thus, when charge pump 100 operates at minimum energy, e.g., low $V_{DD}$, the current dissipated through ground 108 is, likewise, low. However, when charge pump 100 operates at higher energy conditions, e.g., high $V_{DD}$, much more current is dissipated through ground 108, thus evidencing the inefficient operation of the regulating system of FIG. 1. Accordingly, while the system of FIG. 1 provides a regulated and constant output voltage, the charge pump may operate at a very low efficiency.

U.S. Pat. No. 5,276,646 of Kim et al., which is hereby incorporated herein by reference in its entirety, describes yet another system and method for providing a constant voltage at the output of a charge pump. The system and method taught in Kim continuously measures the output of the charge pump and enables or disables the operation of the charge pump based on the value of the measured output voltage being above or below the desired output voltage. Application of this method causes a large delay between the actual reading of the output voltage and the corrective action taken with respect to the operation of the charge pump such that a ripple effect of as high as 1 volt is introduced at the output voltage of the charge pump. Moreover, when the charge pump is turned on, large substrate noises occur.

U.S. Pat. No. 5,717,581 of Canclini, which is hereby incorporated herein by reference in its entirety, presents another method for regulating the output voltage of a charge pump whereby the output voltage is utilized to control the conductances of the charge transfer transistors along the pump which, in turn, controls the output voltage itself. This method is wasteful in terms of energy usage because, when the charge pump is under maximum energy condition, regulation of the charge pump can only be achieved by reducing the overall efficiency of the charge pump.

U.S. Pat. No. 6,107,862 of Mukainakano et al. and U.S. Pat. No. 5,559,687 of Nicollini et al., which are hereby incorporated herein by reference in their entirety, teach a system and method for regulating the output voltage of a charge pump by varying and controlling the ramp rate of the oscillating clock signals fed to the energy injection capacitors of the charge pump. Unfortunately, this method obviously limits the oscillating clock signals to low frequency operation. Moreover, varying the ramp rate of the oscillating clock signals may interfere with a 4-phase clock charge pump's requirement for oscillating clock signals having clean, well defined, non-overlapping phases. The regulating methods and systems taught in Mukainakano and Nicollini can not effectively be utilized with 4-phase clock charge pumps (such as that described in the above-mentioned co-pending patent application) because such charge pumps require high frequency operation and non-overlapping phases.

U.S. Pat. No. 5,553,030 of Tedrow et al., which is hereby incorporated herein by reference in its entirety, describes a method for controlling the output voltage of a charge pump by varying the frequency of the oscillating clock signals that power and control the charge pump. Using this method, the output of the charge pump increases with an increase in oscillating clock signal frequency. Unfortunately, in 4-phase clock charge pumps, the output voltage of the charge pump will begin to decrease above a certain high input frequency. Thus, the use of relatively high frequencies with the system described by Tedrow will cause instability at high frequency. In order to prevent such instability, the charge pump should nominally be operated at a relatively low frequency which results in a charge pump output that is, likewise, low relative to the input. Moreover, utilization of the frequency varying system described in Tedrow requires the use of multiple oscillating clock signal circuitry to provide a signal of the particular frequency presently required at any particular node of the charge pump. This adds considerable cost, complexity and inefficiency to the design of the output voltage regulating system.

What is desired, therefore, and has heretofore been unavailable is an output voltage regulating system and method for a charge pump that avoids the inefficiencies of the above-described prior art systems while providing a stable, continuous boosted output voltage for a charge pump.

SUMMARY OF THE INVENTION

An embodiment of an improved charge pump output voltage regulating system of the present invention includes a charge pump of the type including a plurality of stages which together provide a boosted output, each stage having an energy injection capacitor charged by a clock which oscillates between a reference level (Vref) and a supply level (Vsupp), the improvement further including a feedback loop connected between the boosted output and a supply of the clock. The feedback loop dynamically regulates the supply level so that the boosted output is constant.

In a more specific embodiment of the present invention, the charge pump is part of an integrated circuit coupled to a voltage source of magnitude $V_{DD}$, and the supply level (Vsupp) ranges from the reference level (Vref) to the voltage source magnitude ($V_{DD}$).

In another aspect of the present invention, a charge pump having a regulated output, includes: a main pump having a driver for charging an energy injection capacitor and an output; a regulator having a first signal input connected to a constant voltage bias and a second signal input connected to the main pump output, and a signal output; and a transistor having a control terminal connected to the signal output, a voltage supply terminal connected to a voltage supply, and an output terminal connected to either a positive or a negative supply rail of the driver.

In a more specific aspect of the present invention, the transistor is an nMOS device, the control terminal is the gate terminal, the voltage supply terminal is the drain terminal, and the output terminal is the source terminal. In this configuration, the transistor is connected as a source follower.

In another aspect of the present invention, a charge pump having a regulated output, includes: a main pump having a driver for charging an energy injection capacitor and an output; a regulator having a first signal input connected to a reference and a second signal input connected to the main pump output, and a signal output; a transistor having a control terminal connected to the signal output, a voltage supply terminal connected to ground potential, and an output terminal connected to a negative supply rail of the driver.

Other objects and features of the present invention will be described hereinafter in detail by way of certain preferred embodiments with reference to the accompanying drawings.

DETAILED DESCRIPTION OF THE PREFERRED EMBODIMENT

Figure 1:
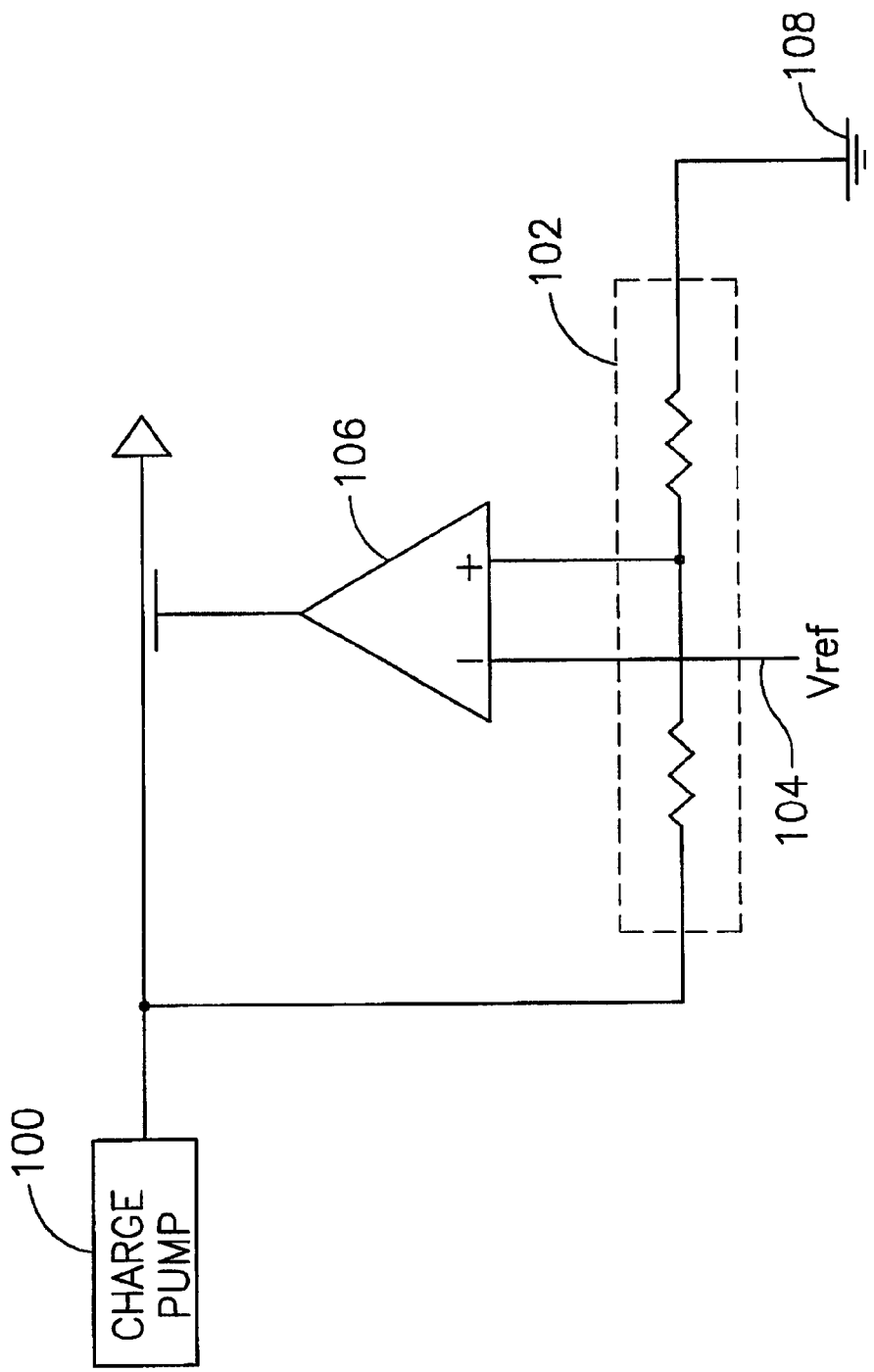
FIG. 1 illustrates a prior art shunting system for charge pump output voltage regulation.

The present invention relates to charge pumps and methods of regulating the same. As known in the art, charge pumps are generally implemented by cascading stages that include energy injection capacitors and charge transfer elements. Energy is injected into a given stage by a driver which provides a clock signal to the input of the capacitor(s). This signal oscillates between a positive supply rail (for example, $V_{DD}$) and a negative supply rail (for example, GND). The voltage at the output of the capacitor is boosted by the voltage swing between the supply rails. The charge transfer element (often a transistor or a diode) transfers the accumulated charge to the next stage. Each charge pump stage boosts the voltage in proportion to the voltage swing of the driver such that the output of the pump is a multiple of the voltage swing.

The improvement of the present invention is a regulation method and system to provide a charge pump with a constant boosted output. This is accomplished through use of a regulator which samples the pump output and adjusts or clamps the level of one of the supply rails of the driver. The adjusted rail is referred to hereinbelow as Vsupp and the other rail is referred to as Vref. An example of a charge pump that may advantageously utilize the present charge pump regulator is described in the aforesaid copending patent application.

Four embodiments of the present invention will be described hereinbelow. Each of the preferred embodiments includes a charge pump, a clamping regulator and a clamping transistor. The clamping transistor provides a voltage supply level (Vsupp) to the oscillating clock drivers. The oscillating clock signals that charge the energy injection capacitors have a voltage swing between Vsupp and a reference voltage (Vref).

Regulation of the boosted pump output is achieved by sampling the pump's output and adjusting the level of Vsupp. The amount of energy injected into the pump is proportional to the voltage swing between Vsupp and Vref. When the pump is at its minimal energy conditions (i.e. low $V_{DD}$ level, high current drawn from the pump, etc.) this voltage swing will be maximized. When the pump has excess energy, the Vsupp will be adjusted accordingly to provide a lower swing level. In accordance with the above, the regulation will provide the desired constant boosted output voltage, irrespective of process, environmental and/or loading conditions.

Certain of the preferred embodiments also include an auxiliary charge pump that provides a voltage above $V_{DD}$ or below ground to the clamping regulator.

Although the present invention is described with respect to the preferred embodiments, it is understood that the claimed invention is limited only by the language of the claims and that the preferred embodiments described below are meant only to exemplify the design, construction and operation of the charge pump output voltage regulators claimed herein.

In the various embodiments of the present invention which will now be described, the clamping can be utilized for positive or negative charge pumps.

Figure 2:
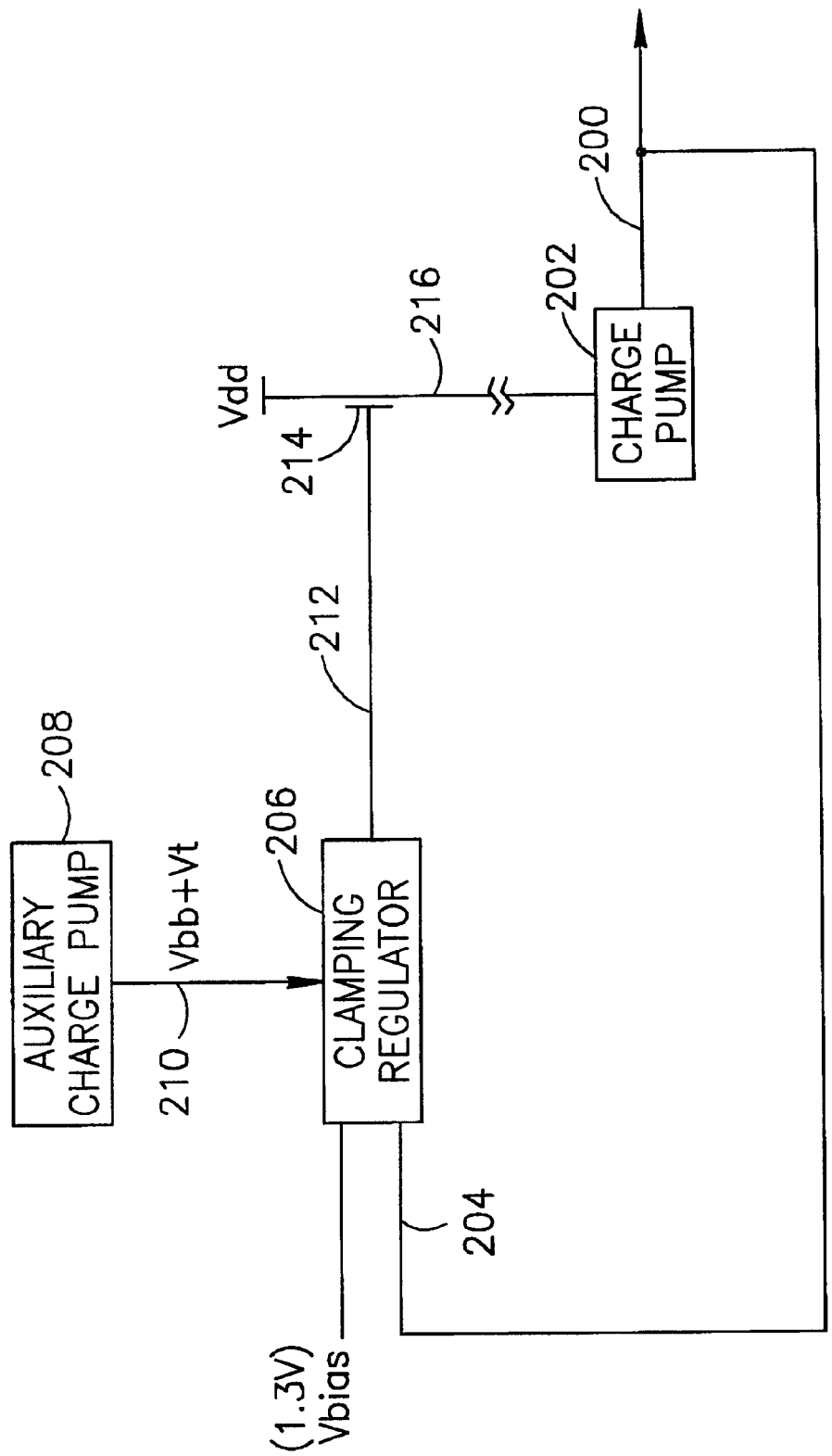
FIG. 2 illustrates a preferred embodiment of a charge pump output voltage regulator of the present invention that utilizes an nMOS transistor as a clamping transistor and also utilizes a positive auxiliary charge pump.

FIG. 2 illustrates, in block diagram form, the preferred embodiment of the present invention which utilizes an nMOS transistor as the clamping transistor and also utilizes a positive auxiliary charge pump. This system will regulate the output of a charge pump.

As shown in FIG. 2, output voltage 200 of charge pump 202 is connected to input 204 of clamping regulator 206. Clamping regulator 206 is provided with a boosted supply from auxiliary charge pump 208. The maximum voltage provided at the output 210 of auxiliary charge pump 208 to clamping regulator 206 is at least $V_{DD}$+Vt. ($V_t$ is the transistor threshold voltage). Output 212 of clamping regulator 206 couples to the gate terminal of nMOS transistor 214. The presence of the additional voltage provided by auxiliary charge pump 208 drives the clamping bias 212 at the gate of nMOS transistor 214, i.e. the clamping transistor, to a maximum value of $V_{DD}$+Vt.

With continued reference to FIG. 2, voltage supply level 216 ($V_{supp}$) is the positive supply of the oscillating clock signal generator (not shown) and is provided from the source terminal of nMOS transistor 214. Thus, using this configuration, when the voltage provided to the gate terminal of nMOS transistor 214 is $V_{DD}$+Vt, $V_{supp}$ 216 is $V_{DD}$. Clamping regulator 206 contains within it a voltage divider which divides pump output 240 by a fixed ratio. This divided output is compared to a fixed bias voltage, Vbias. The regulator will adjust the clamping bias 212 and thus Vsupp 216, so that the divided output equals Vbias. Thus, in the steady state, the pump output will be constant voltage having a value is determined by Vbias and the divider ratio.

Figure 3:
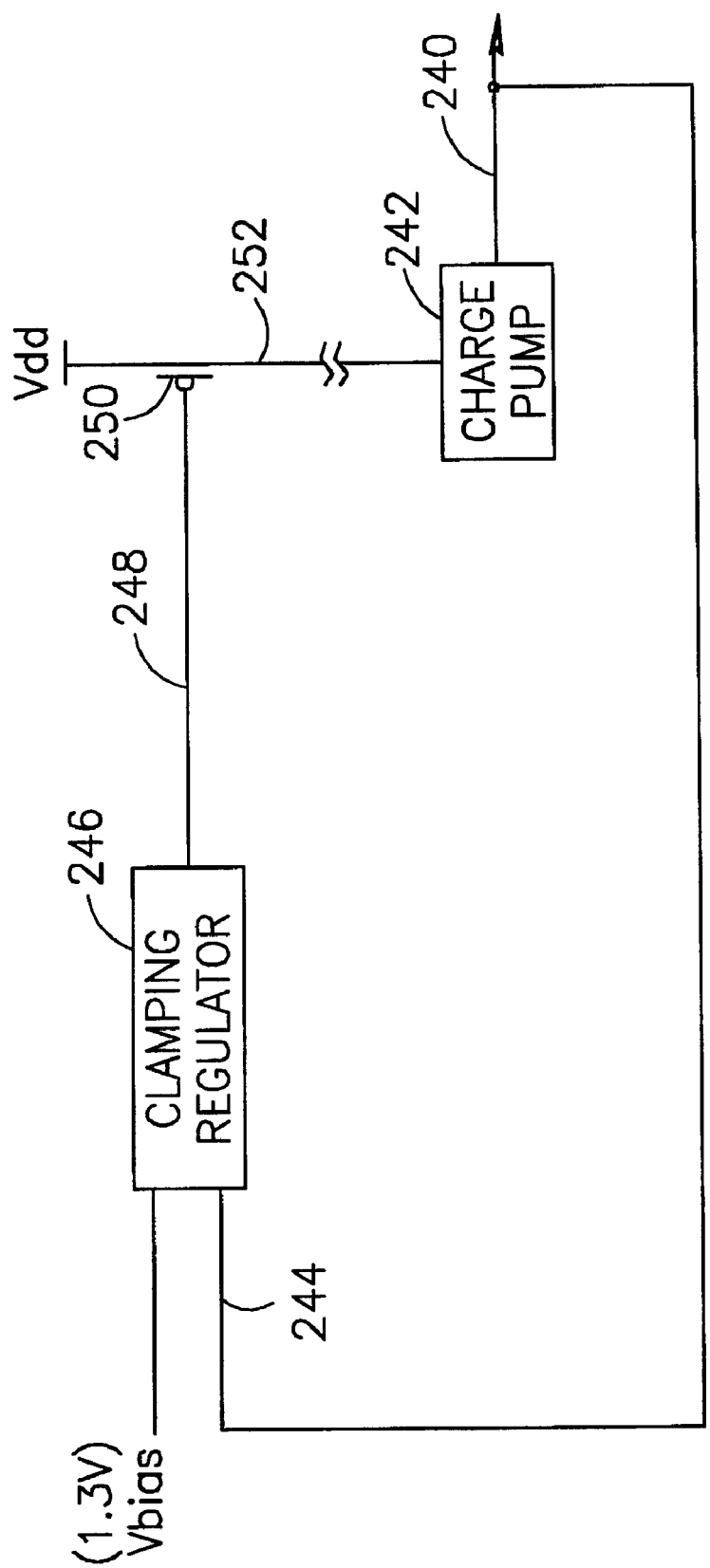
FIG. 3 illustrates a second embodiment of a charge pump output voltage regulator of the present invention that utilizes a pMOS transistor as the clamping transistor but does not utilize an auxiliary charge pump.
Figure 4:
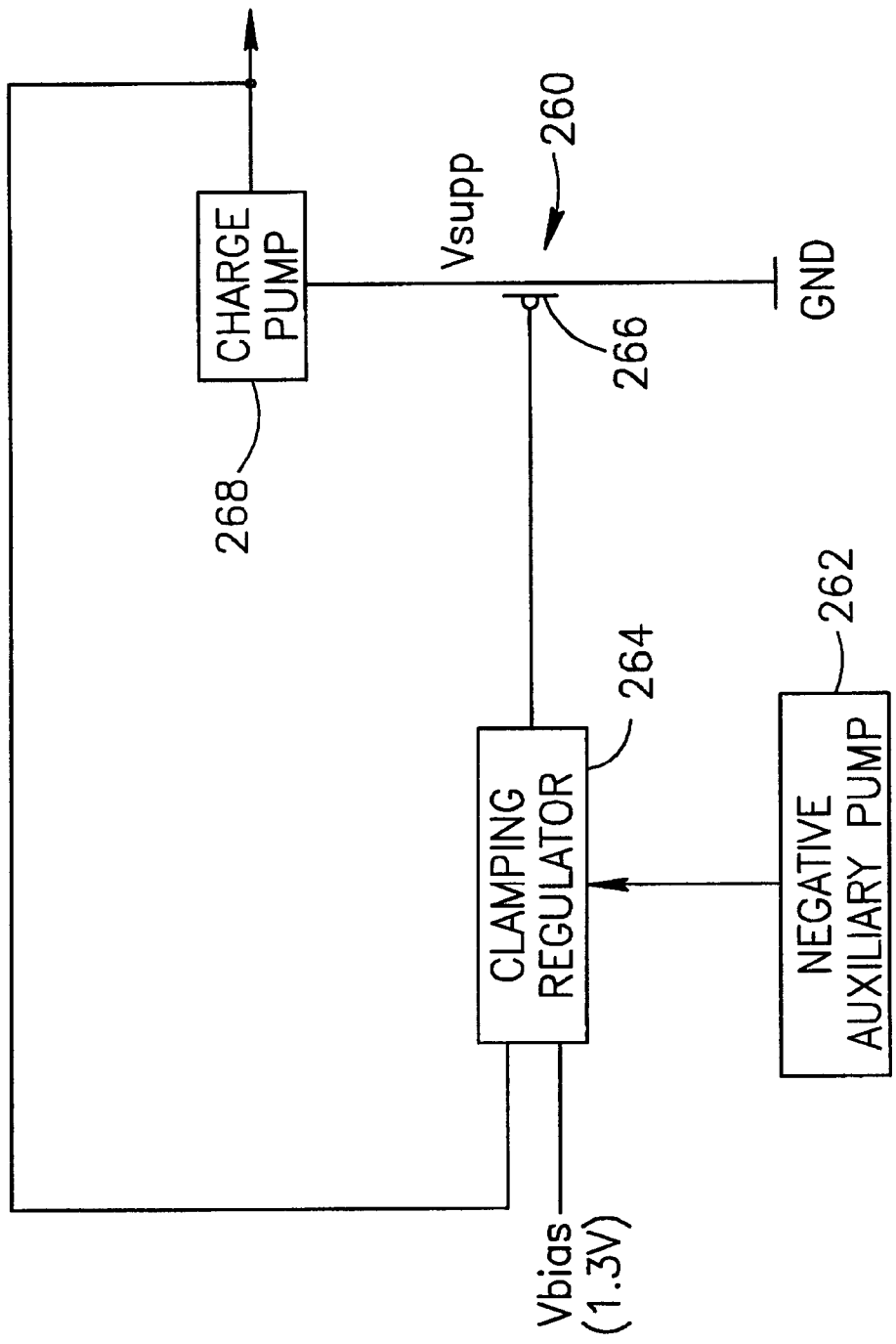
FIG. 4 illustrates a third embodiment of a charge pump output voltage regulator of the present invention that utilizes a pMOS transistor as a source follower and also utilizes a negative auxiliary pump.
Figure 5:
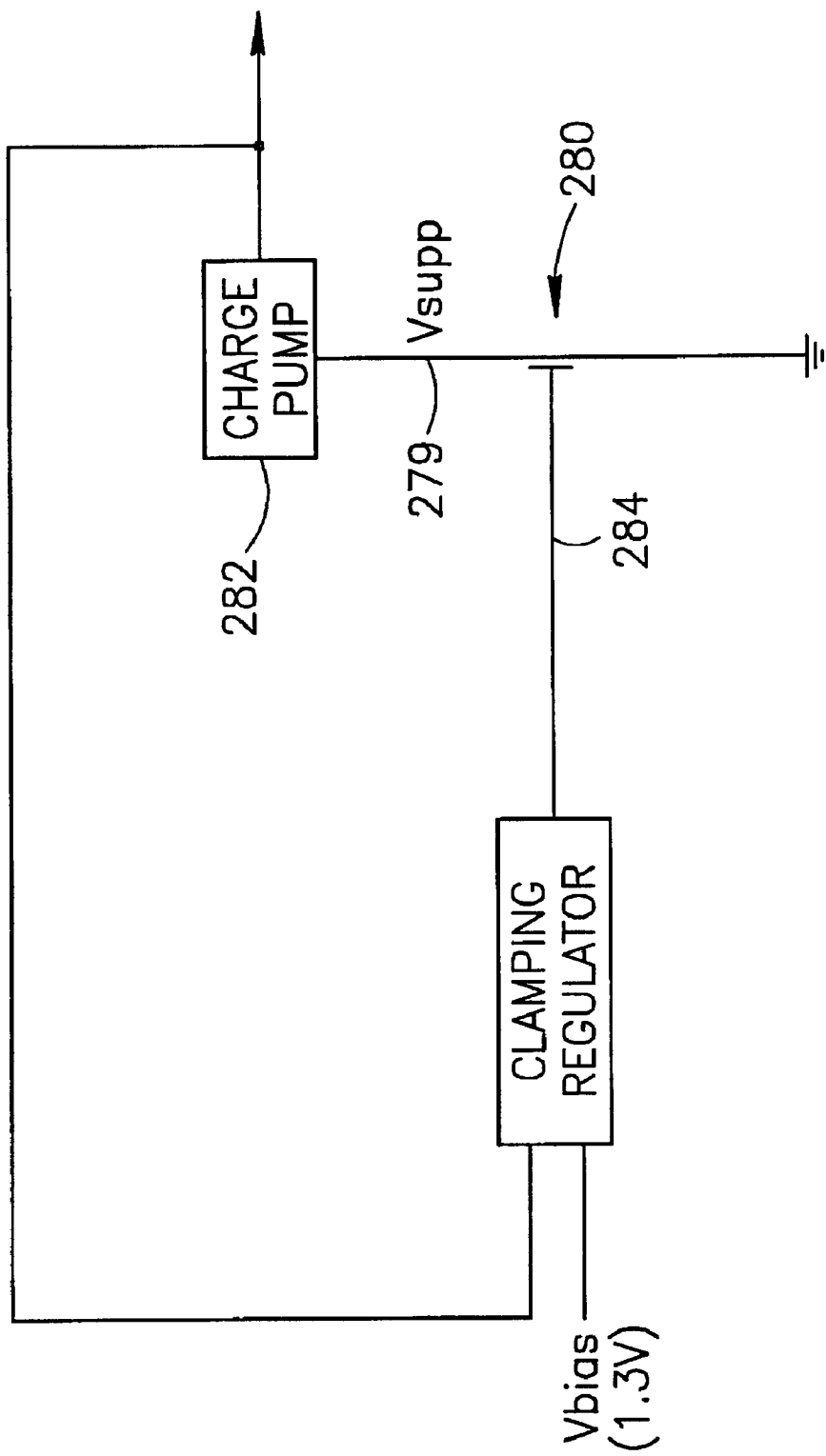
FIG. 5 illustrates a fourth embodiment of a charge pump output voltage regulator of the present invention that utilizes an nMOS transistor as an inverting amplifier but does not utilize an auxiliary pump.

FIG. 2 shows an embodiment where an nMOS transistor is used to clamp the positive supply rail. It is possible to clamp either the positive or negative supply rail with either an nMOS or pMOS transistor. Three other embodiments are shown in FIGS. 3, 4 and 5 which cover the other possible combinations. An important feature in all of the combinations is that the clamping transistor is able to drive Vsupp to its maximum possible value ($V_{DD}$ for the positive supply and GND for the negative supply) to maximize the pump's current drive capacity. The construction and operation of the charge pump output voltage regulator of FIG. 2 will be further described in greater detail below.

FIG. 3 illustrates, in block diagram form, an embodiment of the present invention for regulating the output of a positive charge pump. The system of FIG. 3 utilizes a pMOS transistor as the clamping transistor for the positive supply rail but does not utilize an auxiliary charge pump.

As illustrated in FIG. 3, output voltage 240 of positive charge pump 242 is connected to input 244 of clamping regulator 246. Clamping regulator 246 (unlike clamping regulator 206 of FIG. 2) receives no auxiliary power from an auxiliary power source. Output 248 of clamping regulator 246 couples to the gate terminal of pMOS transistor 250. Accordingly, voltage supply level 252 (Vsupp) (which is provided by the drain terminal of pMOS transistor 250) has a maximum value of $V_{DD}$. Because pMOS transistor 250 is an inverting transistor, the clamping bias at the gate of pMOS transistor 250 need not be boosted because, when the gate bias is 0 V, the voltage supply level is equal to $V_{DD}$.

FIG. 4 illustrates, in block diagram form, yet another embodiment of the present invention wherein the system utilizes a pMOS transistor 260 as a source follower for clamping the negative supply rail. A negative auxiliary pump 262 is used to provide the clamping regulator 264 with negative voltage, namely, (GND−Vt). Clamping regulator 264, in turn, provides negative voltage to gate terminal 266 of pMOS transistor 260. In this manner, pMOS transistor 260 ultimately provides full GND as the Vsupp to the charge pump 268.

FIG. 5 illustrates another embodiment of the present invention. No auxiliary pump is required in this embodiment. The system of FIG. 5 utilizes an nMOS transistor 280 as an inverting amplifier to clamp the negative supply rail. Vsupp 279 provided to charge pump 282 clamps the voltage supply to a value greater than GND. Accordingly, in this embodiment, the voltage at gate 284 of transistor 280 need not be boosted.

The above-mentioned embodiments will now be further described primarily with reference to the embodiment of FIG. 2. Where possible and practical, like numerals designate like components in the below-described figures.

Figure 6:
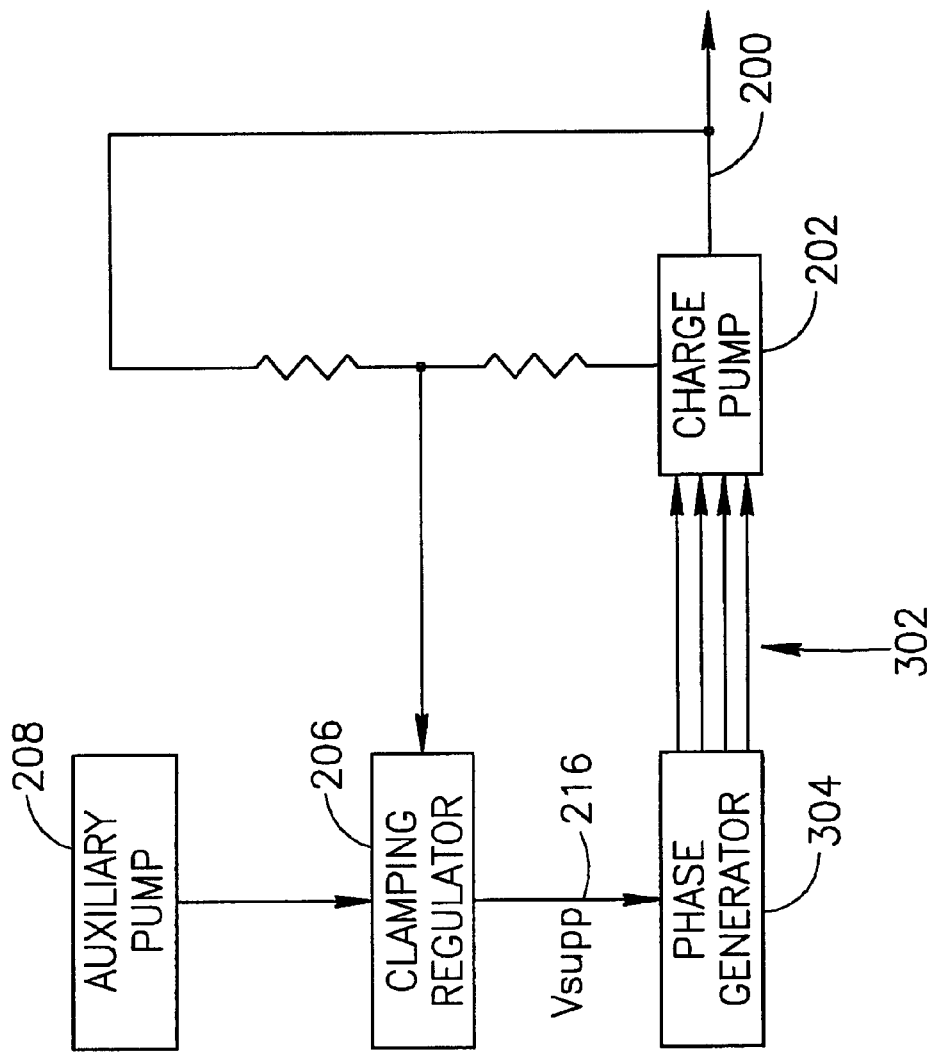
FIG. 6 illustrates a more detailed system configuration of the first embodiment of the charge pump output voltage regulator illustrated in FIG. 2.

FIG. 6 illustrates, in greater detail, a circuit for providing voltage to an output-voltage regulated charge pump in accordance with the embodiment of the invention illustrated in FIG. 2.

As shown in FIG. 6, charge pump 202 receives power and control oscillating clock signals 302 from the oscillating clock signal generator, i.e., phase generator 304. Clamping regulator 206 provides Vsupp 216 to phase generator 304. Vsupp 216 ranges between Vt and $V_{DD}$, i.e., when greater voltage is necessary during the voltage regulation process, a voltage nearer to $V_{DD}$ is provided, whereas when less power is required voltage nearer to Vt is provided. The production of Vsupp 216 is controlled by the feedback voltage received by clamping regulator 206 from output 200 of charge pump 202. Optionally, clamping regulator 206 is connected to output 200 through a voltage divider (as illustrated).

Figure 7:
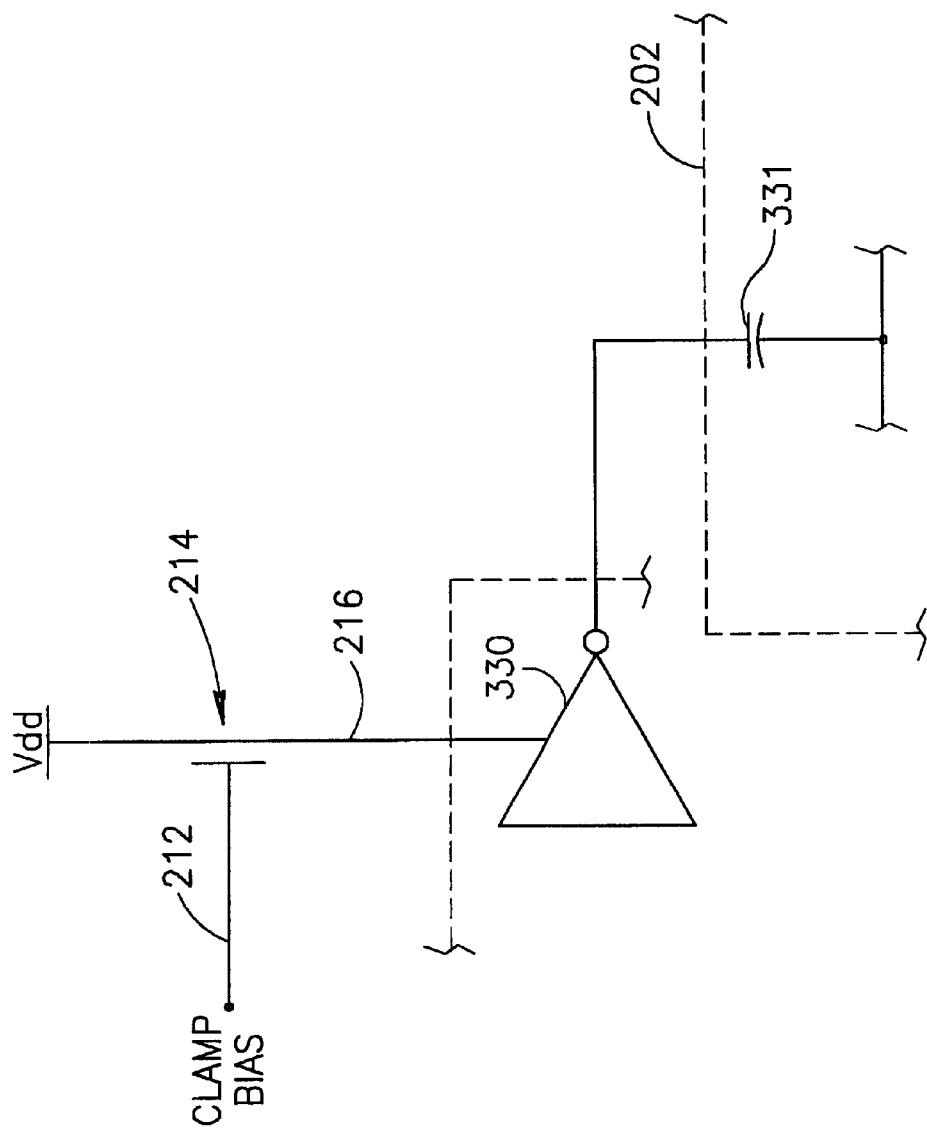
FIG. 7 illustrates a preferred embodiment for a circuit for driving the supply voltage provided to the phase generator and charge pump of FIG. 6.

FIG. 7 illustrates a preferred circuit configuration for driving Vsupp 216 of FIG. 6. In this embodiment, a clamp bias (which is generated by the joint operation of auxiliary pump 208 and clamping regulator 206 of FIG. 6) provides voltage to gate terminal 212 of nMOS transistor 214. nMOS transistor 214 acts as a source follower where Vsupp 216 is equal to the bias voltage less Vt. Accordingly, under operating conditions, when Vsupp must equal $V_{DD}$, the clamp bias on terminal 212 rises to $V_{DD}$+Vt.

Vsupp, as illustrated in FIG. 7, then feeds into a driver 330 of phase generator 304. The output of driver 330 feeds charge pump 202 and charges energy injection capacitor 331. Thus, because the energy injected into charge pump 202 is linearly proportional to Vsupp 216, Vsupp 216 is effectively utilized to regulate output 200 of charge pump 202. Additionally, in FIG. 7 the positive supply rail of the driver is regulated. It is also possible to regulate the negative supply rail as in FIGS. 4 and 5. All the figures shown thus far (FIGS. 2–7) can be applied equally to positive or negative charge pumps.

Figure 8:
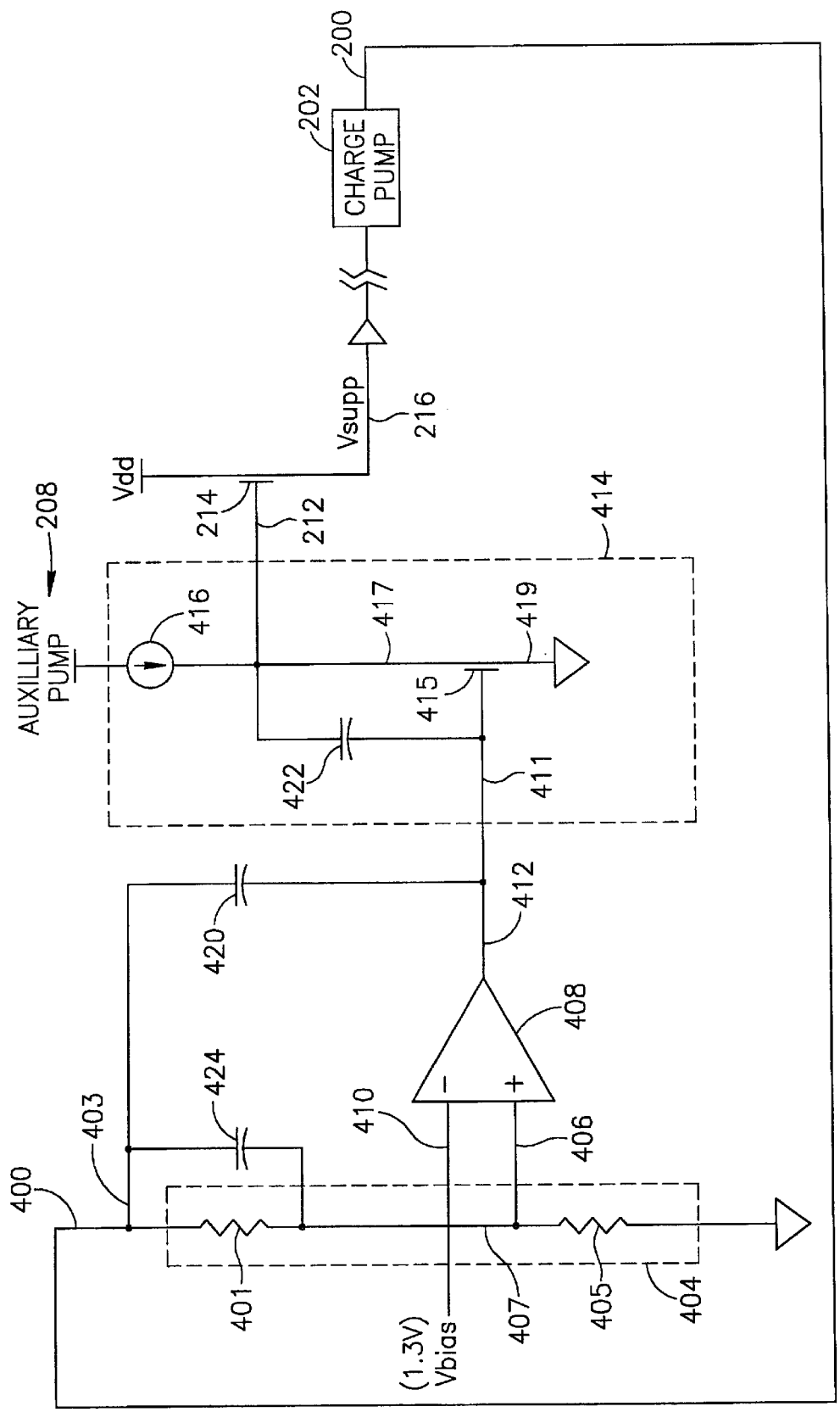
FIG. 8 illustrates a preferred embodiment for a clamping regulator of the present invention.

In FIG. 8, a clamping regulator for a positive charge pump is shown utilizing the embodiment of the present invention illustrated in FIG. 2, when an nMOS source follower is used to regulate the positive supply rail of the capacitor drivers.

With continued reference to FIG. 8, the output 220 of charge pump 202 is connected to the first terminal of a resistor 401 at node 403. The second terminal of resistor 401 is connected to the first terminal of a second resistor 405 at node 407. A capacitor, 424, is connected between node 403 and node 407. The second terminal of resistor 405 is connected to ground. Resistors 401 and 405 constitute a voltage divider 404.

Node 407 is connected to the positive input of an operational amplifier 408 while Vbias is connected to the negative input of operational amplifier 408. A second capacitor 420 is connected between node 412 and node 403.

With further reference to FIG. 8, output 412 of operational amplifier 408 is also connected to gate terminal 411 of an nMOS transistor 415. The drain terminal 417 of transistor 415 is coupled to gate terminal 411 of transistor 415 via a third capacitor 422. The source terminal 419 of transistor 415 is connected to ground. The drain terminal 417 of transistor 415 is also connected to the output of a current source 416 derived from auxiliary pump 208.

The drain terminal 417 of transistor 415 is additionally connected to the gate terminal 212 of a second nMOS transistor 214. The drain terminal of transistor 214 is connected to $V_{DD}$. The source terminal 216 of transistor 214 carries Vsupp. Vsupp controls the operation of charge pump 202 insofar as it constitutes the positive supply of the capacitor drivers.

As shown in FIG. 8, the clamping regulator utilizes a single global feedback from output 200 of charge pump 202 to control Vsupp 216. Resistor divider 404 divides output 200 of charge pump 202 producing divided output 406. Differential comparator 408 compares divided output 406 to a constant bias voltage 410 (Vbias) producing output 412. The nominal value of Vbias is preferably 1.3 V. Output 412 of comparator stage 408 is then input to inverting stage 414. The purpose of inverting stage 414 is to enhance the signal from output 412. The supply of comparator 408 can be $V_{DD}$.

The inverting transistor 415 is connected to current source 416 from auxiliary pump 208 which allows output 212 (the clamp bias of FIG. 7) of inverting stage 414 to rise above $V_{DD}$ to as high as $V_{DD}$+Vt. Current source 416 is essentially a bleeder element which may include a resistor or transistor and preferably provides a nominal current of 10 uA.

Advantageously, using this configuration, inverting stage 414 requires only a relatively small amount of current such that only a relatively small component area need be occupied by auxiliary pump 208. The auxiliary pump also consumes negligible $V_{DD}$ current. Moreover, capacitors 420 and 422 are provided for negative feedback to stabilize the overall operation of clamping regulator 206 while capacitor 424 acts as a lead-compensation capacitor.

The clamping regulator provides negative feedback to the pump via Vsupp. This feedback force inputs 410 and 406 to the comparator 408 to be equal. Since 406 is a divided pump output, the pump's output is a multiple of (Vbias–GND) based on the resistor ratio in the resistor divider 404.

Figure 9:
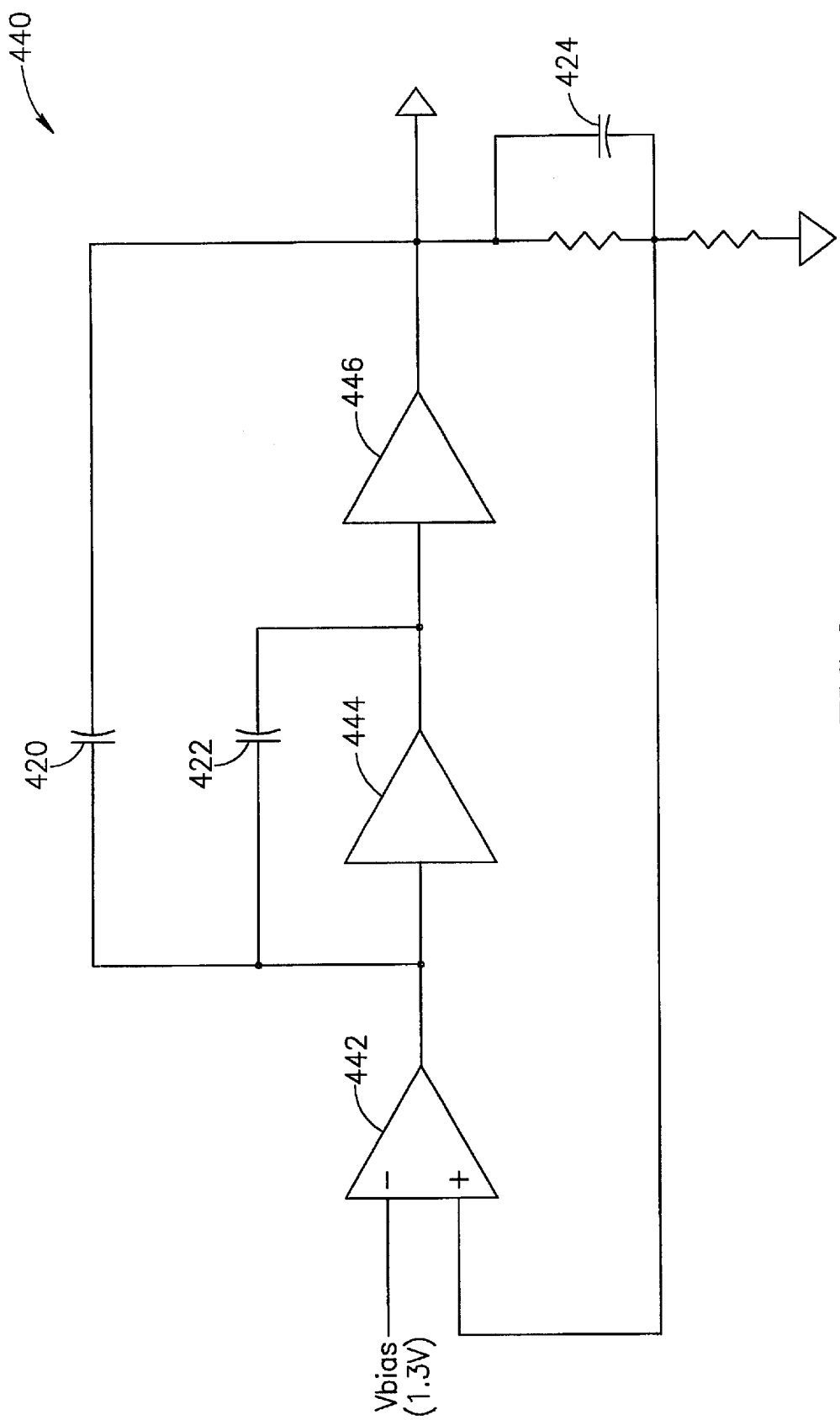
FIG. 9 illustrates a charge pump output voltage regulator of the present invention in the form of a 3-stage operational amplifier circuit.

It is understood that a gain factor exists as between Vsupp 216, i.e., the output of clamping regulator 206, and output 202 of charge pump 200 because output 202 of charge pump 200 is a multiple (greater than one) of its input. Thus, one skilled in the art will appreciate that the system of the present invention may be advantageously described more generally as a 3-stage operational amplifier circuit as illustrated in FIG. 9.

The 3-stage operational amplifier circuit 440 of FIG. 9 includes a differential stage 442 (408 in FIG. 8), an inverting stage 444 (414 in FIG. 8) and a charge pump stage 446—the equivalent components for each respective stage having been previously described with reference to FIGS. 2, and 6–8. FIG. 9 further illustrates that the only negative feedback present in the 3-stage operational amplifier circuit is provided through capacitors 420,422 and 424, respectively (See FIG. 8).

A more detailed description of a clamping regulator for use with a negative charge pump will now be described in further reference to the embodiment illustrated in FIG. 2.

Figure 10:
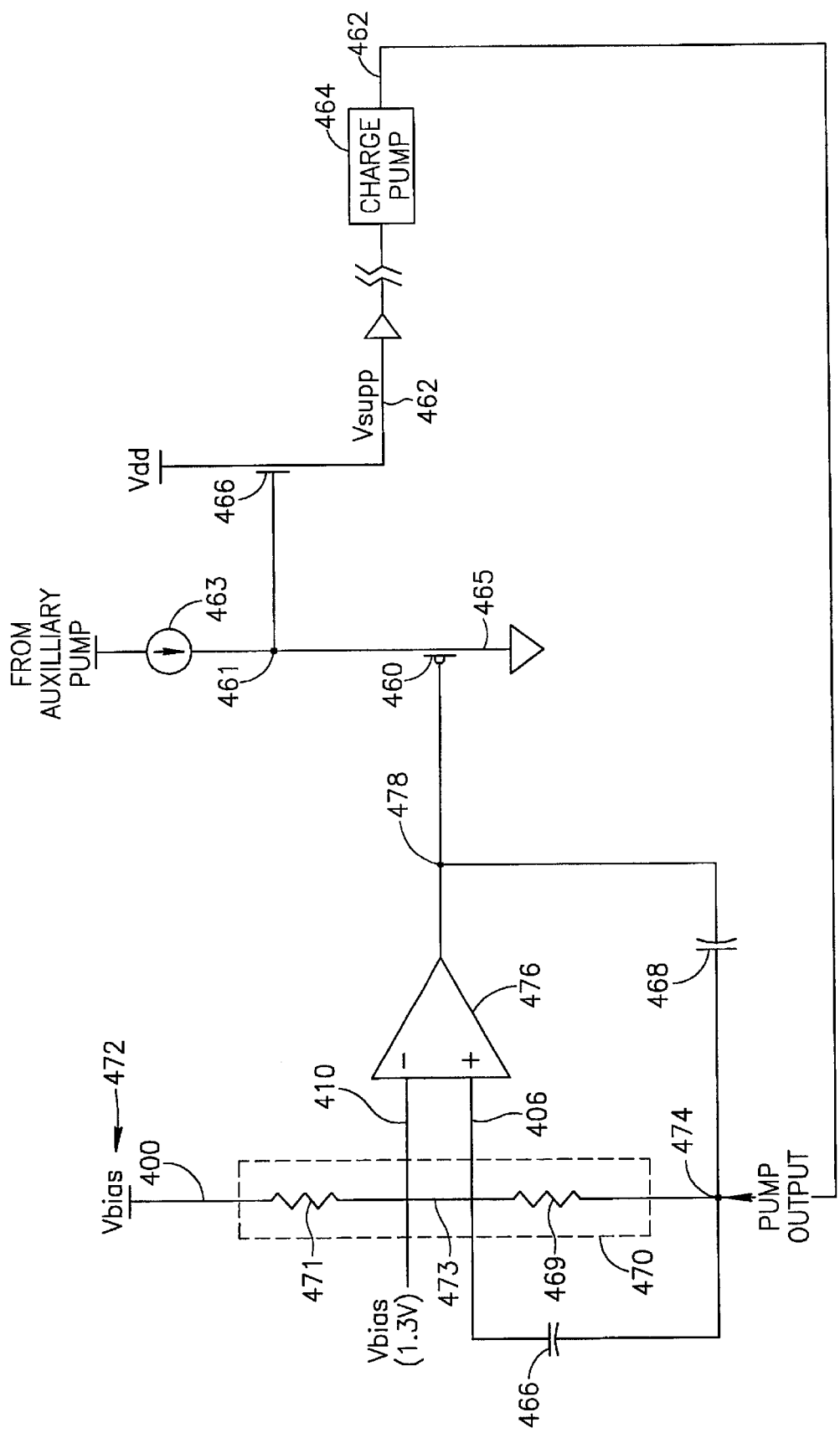
FIG. 10 illustrates the design of a preferred embodiment of a clamping regulator for a negative charge pump in accordance with the system of FIG. 2.

FIG. 10 illustrates the design of a preferred embodiment of a clamping regulator for a negative charge pump.

With reference to FIG. 10, a constant bias voltage Vbias 472 is connected to the first terminal of a resistor 471 while the second terminal of resistor 471 is connected to the first terminal of a second resistor 469 via node 473. Vbias is preferably 1.3 V. The second terminal of resistor 469 is connected to the output 462 of charge pump 464 at node 474. A capacitor, 466, is connected between nodes 474 and 473.

Node 473 is connected to the negative input of an operational amplifier 476 while Vref is connected to the positive input of operational amplifier 476. It is noted that Vref is the ground voltage of the system, i.e., 0 V. The output of operational amplifier 476 is coupled to node 474 via a second capacitor 468.

With continued reference to FIG. 10, node 478 is connected to the gate terminal of pMOS transistor 460. The source terminal 461 of transistor 460 is connected to a current source 463 from an auxiliary pump while the drain terminal 465 of transistor 460 is connected to ground.

The source terminal 461 of transistor 460 is also connected to the gate terminal of nMOS transistor 466. The drain terminal of transistor 466 is connected to $V_{DD}$ and the source terminal of transistor 460 is connected to Vsupp. Vsupp controls charge pump 464 insofar as it is the positive supply rail of the capacitor drivers.

The clamping regulator of FIG. 10 is similar to that of FIG. 8 except that inverting stage 414 of FIG. 8 has been replaced by source follower 460. Source follower 460, unlike inverting stage 414, does not cause the inversion of its input. In a negative charge pump an inversion already occurs between Vsupp and output 462 of charge pump 464 such that an additional inversion is not necessary.

Additionally, the resistor divider is between the negative pump output and a constant positive voltage, Vbias. The nominal value of Vbias is preferably around 1.3 V. The inputs to the operational amplifier 476 are the intermediate node of the resistor divider and GND (Vref). The feedback system will force the inputs to be at the same value, namely GND. The boosted negative voltage, 462, will thus be a multiple of (Vbias-GND), where the multiple is determined by the resistor ratio of voltage divider 470.

Two compensation capacitors are utilized in the clamping regulator of FIG. 10. Capacitor 466 is a lead compensation capacitor and capacitor 468 is a Miller capacitor. Moreover, as illustrated in FIG. 10, voltage divider 470 is located between negative charge pump output 462 and positive bias voltage 472 (Vbias).

As one skilled in the art will appreciate, in both the positive and negative charge pump regulator circuits described above, when the regulated charge pump reaches steady state, the differential inputs of the operational amplifier are equal and the output of the charge pump is thereby defined by the ratio of the voltage divider and Vbias.

The present inventive charge pump regulator, as described in the above embodiments, overcomes the limitations of the prior art systems that were described in the Background section. Advantageously, in the above-described embodiments, the regulated output voltage of the charge pump is a constant valve, set by the resistor dividers of FIGS. 6, 8 and 10 throughout the range of operation of the charge pump. Moreover, the charge pump is always operational, i.e., it is always on, and so ripple in the output voltage is nearly eliminated. Additionally, the output voltage regulator of the present invention has no inherent operational frequency limitations and, therefore, can be utilized in 4-phase multi-stage charge pumps.

The above-described embodiments of the present invention utilize a set value of the supply Vsupp to sustain the pump output at a fixed value irrespective of process, environment and loading conditions.

It is understood that many variations and modifications of the above-described preferred embodiments are possible by one skilled in the art without departing from the scope of the claimed invention which is defined only by the recitation of the claims which follow. One skilled in the art will readily appreciate that many variations in, e.g., respective component values, circuit design, stage order and other design and construction preferences can be undertaken within the limitations of the claimed invention.

It is further understood that nMOS FETs are inherently symmetrical devices with respect to the source and drain. Thus, the designation of source and drain should be considered in the broadest sense.

What is claimed is:

1. In a charge pump of the type including a plurality of stages which provide a boosted output voltage, each stage having an energy injection capacitor charged by a clock which oscillates between a reference level voltage and a supply level voltage, the improvement comprising:
   a feedback loop connected between the boosted output voltage and the supply level voltage of the clock, the feedback loop dynamically regulating the supply level voltage so that the boosted output voltage is constant.

2. The charge pump as in claim 1, wherein the reference level voltage is a negative supply voltage.

3. The charge pump as in claim 2, wherein the negative supply voltage is ground potential.

4. The charge pump as in claim 1, wherein the reference level voltage is a positive supply voltage.

5. The charge pump as in claim 4, wherein the positive supply voltage is a voltage source of magnitude $V_{DD}$.

6. The charge pump as in claim 1, wherein the range of the supply level voltage is from the reference level voltage to the maximum input supply voltage available to the charge pump.

7. The charge pump as in claim 1, wherein the charge pump is part of an integrated circuit coupled to a voltage source of magnitude $V_{DD}$ and wherein the supply level voltage ranges from the reference level voltage to a voltage source of magnitude $V_{DD}$.

8. The charge pump as in claim 7, further including a transistor having a threshold voltage, wherein the range of the supply level voltage is from the threshold voltage of the transistor on the integrated circuit to $V_{DD}$.

9. A charge pump having a regulated output, comprising:
   1) a main pump having an output and at least one driver for charging one or more energy injection capacitors;
   2) a regulator having a first signal input connected to a bias voltage and a second signal input connected to the main pump output, and a signal output; and
   3) a transistor having a control terminal connected to the signal output, a voltage supply terminal connected to one of a positive and negative voltage supply, and an output terminal connected to a corresponding supply rail of the driver.

10. The charge pump as in claim 9, wherein the transistor is an nMOS device having a threshold voltage, the control terminal is the gate terminal, the voltage supply terminal is the drain terminal, and the output terminal is the source terminal, wherein the transistor is connected as a source follower and the drain terminal is connected to a positive voltage supply of magnitude $V_{DD}$.

11. The charge pump as in claim 10, wherein the voltage provided to the control terminal has a maximum value of the sum of $V_{DD}$ and the threshold voltage of the nMOS device whereby the output of the source follower has a maximum value of $V_{DD}$.

12. The charge pump as in claim 10, wherein the regulator has as its positive supply voltage a first voltage source which is greater than the positive voltage supply of magnitude $V_{DD}$, whereby the regulator drives the signal output to a voltage less than or equal to the first voltage source.

13. The charge pump as in claim 12, wherein the first voltage source is at least the sum of $V_{DD}$ and the threshold voltage of the nMOS device.

14. The charge pump as in claim 13, wherein the first voltage source is generated by an auxiliary pump.

15. The charge pump as in claim 9, wherein the transistor is a pMOS device and the output terminal is the drain terminal, the drain terminal being connected to the positive supply rail of the driver.

16. The charge pump as in claim 10, further comprising an auxiliary pump connected so as to drive the regulator to a voltage of at least about the sum of $V_{DD}$ and the threshold voltage of the nMOS device.

17. The charge pump as in claim 9, wherein the regulator comprises:
   a voltage divider having an input and an output;
   a differential stage having a first input, a second input, and an output; and
   an inverting stage, having an input and an output;
   wherein,
   the input of the voltage divider is the second signal input of the regulator,
   the output of the voltage divider is connected to the second input of the differential stage,
   the first input of the differential stage is the first signal input of the regulator,
   the output of the differential stage is connected to the input of the inverting stage, and
   the output of the inverting stage is the signal output of the regulator.

18. The charge pump as in claim 17, further comprising:
   a first capacitor connected between the main pump output and the output of the voltage divider;
   a second capacitor connected between the main pump output and the input of the inverting stage; and
   a third capacitor connected between the input of the inverting stage and the output of the inverting stage.

19. A charge pump having a regulated output, comprising:
   1) a main pump having one or more drivers for charging one or more energy injection capacitors, and an output;
   2) a regulator having a first signal input connected to a bias voltage and a second signal input connected to the main pump output, and a signal output; and
   3) a transistor having a control terminal connected to the signal output, a voltage supply terminal connected to ground potential, and an output terminal connected to a negative supply rail of the driver.

20. The charge pump as in claim 19, wherein the transistor is an nMOS device and the output terminal is the drain terminal, the drain terminal being connected to the negative supply rail of the driver.

21. The charge pump as in claim 19, wherein the transistor is a pMOS device and the output terminal is the source terminal, the source terminal being connected to the negative supply rail of the driver.

22. A circuit for regulating a positive charge pump, the charge pump having an input, an output and one or more energy injection capacitors driven by at least one clock signal that oscillates between a negative supply rail and a positive supply rail, the circuit comprising:

a first resistor having first and second terminals, the first terminal of the first resistor connected to the output of the charge pump at a first circuit node, and the second terminal of the first resistor connected to a second circuit node;

a second resistor having first and second terminals, the first terminal of the second resistor connected to the second circuit node, and the second terminal of the second resistor connected to the negative supply rail;

an operational amplifier having a negative input, a positive input and an output, the negative input connected to a bias voltage, the positive input connected to the second circuit node, and the output connected to a third circuit node;

a first nMOS transistor having a gate terminal, a source terminal and a drain terminal, the gate terminal of the first nMOS transistor connected to the third circuit node, the source terminal of the first nMOS transistor connected to the negative supply rail, and the drain terminal of the first nMOS transistor connected to a fourth circuit node;

a first voltage source having an output;

a second voltage source having an output, the second voltage source being less than the first voltage source;

a current bleeder element having an input and an output, the input of the bleeder element connected to the output of the first voltage source, and the output of the current bleeder element connected to the fourth circuit node; and a second nMOS transistor having a gate terminal, a drain terminal and a source terminal, the gate terminal of the second nMOS transistor connected to the fourth circuit node, the drain terminal of the second nMOS transistor connected to the output of the second voltage source, and the source terminal of the second nMOS transistor supplying the positive supply rail to the charge pump.

23. The circuit of claim 22, further comprising:

a first capacitor having first and second terminals, the first terminal of the first capacitor connected to the third circuit node, and the second terminal of the first capacitor connected to the first circuit node;

a second capacitor having first and second terminals, the first terminal of the second capacitor connected to the first circuit node, and the second terminal of the second capacitor connected to the first circuit node; and a third capacitor having first and second terminals, the first terminal of the third capacitor connected to the gate terminal of the first nMOS transistor, and the second terminal of the third capacitor connected to the drain terminal of the first nMOS transistor at the fourth circuit node.

24. A circuit for regulating a negative charge pump, the charge pump having an input, an output and one or more energy injection capacitors driven by at least one clock signal that oscillates between a negative supply rail and a positive supply rail, the circuit comprising:

a first resistor having first and second terminals, the first terminal of the first resistor connected to a constant voltage bias, and the second terminal of the first resistor connected to a first circuit node;

a second resistor having first and second terminals, the first terminal of the second resistor connected to the first circuit node, and the second terminal of the second resistor connected to the output of the charge pump at a second circuit node;

an operational amplifier having a positive input, a negative input and an output, the positive input connected to the negative supply rail, the negative input connected to the first circuit node, and the output connected to a third circuit node;

a pMOS transistor having a gate terminal, a source terminal and a drain terminal, the gate terminal connected to the third circuit node, the drain terminal connected to the negative supply rail and the source terminal connected to a fourth circuit node;

a first voltage source having an output;

a second voltage source having an output, the second voltage source being less than the first voltage source;

a current bleeder element having an input and an output, the input of the bleeder element connected to the output of the first voltage source and the output of the bleeder element connected to the fourth circuit node; and an nMOS transistor having a gate terminal, a source terminal and a drain terminal, the gate terminal connected to the fourth circuit node, the drain terminal connected to the output of the second voltage source and the source terminal supplying the positive supply rail to the charge pump.

25. The circuit of claim 24, further comprising:

a first capacitor having first and second terminals, the first terminal of the first capacitor connected to a third circuit node, and the second terminal of the first capacitor connected to the second circuit node; and a second capacitor having first and second terminals, the first terminal of the second capacitor connected to the first circuit node, the second terminal of the second capacitor connected to the second circuit node.

* * * * *